N. P. Bassett,
Fly Trap.

No. 38,277.  Patented Apr. 28, 1863.

Witnesses:

Inventor:
N. P. Bassett
per Munn & Co.
Attorneys

UNITED STATES PATENT OFFICE.

N. P. BASSETT, OF FULTON, NEW YORK.

IMPROVEMENT IN FLY-TRAPS.

Specification forming part of Letters Patent No. 38,277, dated April 28, 1863.

*To all whom it may concern:*

Be it known that I, N. P. BASSETT, of Fulton, in the county of Oswego and State of New York, have invented a new and Improved Fly-Trap; and I do hereby declare that the following is a full, clear, and exact description of the same, reference being had to the accompanying drawings, making a part of this specification, in which—

Figure 1:
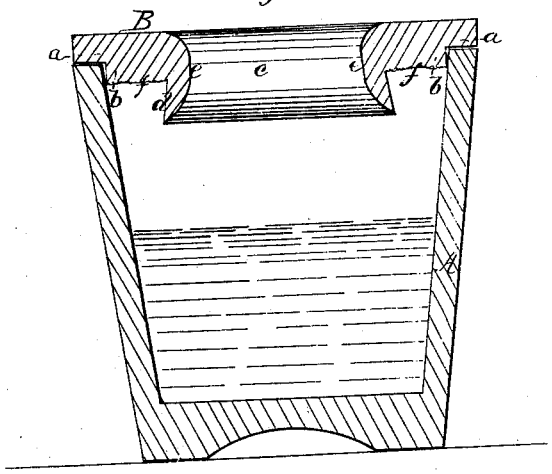
Figure 2:
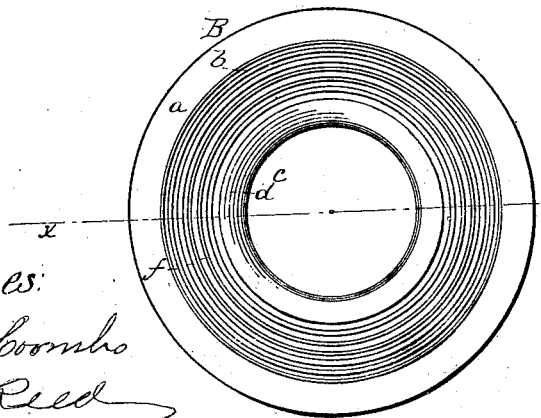

Figure 1 is a vertical central section of my invention, taken in the line $x\ x$, Fig. 2; Fig. 2, an inverted plan or bottom view of the same detached from the tumbler or glass.

Similar letters of reference indicate corresponding parts in the two figures.

This invention relates to an improvement on the simple and well-known fly-trap hitherto formed of a tumbler or other similar vessel and a piece of bread placed on its top with a hole in it and baited with molasses or other suitable substance at its under side. These traps, though simple, answer a very good purpose, many flies being caught by them, although many escape by passing out through the entrance in the same way as they went in.

The object of my invention is to prevent the escape of any of the flies after they have passed through the opening or entrance, and to this end I substitute for the bread a cover of wood or other suitable material with a hole in its center and provided at its under side with a flange, as hereinafter fully shown and described.

To enable those skilled in the art to fully understand and construct my invention, I will proceed to describe it.

A represents a glass tumbler or other suitable vessel, which is filled about two-thirds full of soapsuds; and B is a cover formed of a circular piece of wood or other suitable material, the diameter of which is equal to that of the top of the tumbler. The under side of the cover B has a rabbet, $a$, made in it all around its edge, so as to form a shoulder, $b$, which fits or projects down within the tumbler and retains the cover in proper position on the former. In the center of the cover B there is made a circular opening, $c$, and a flange, $d$, projects down from the under side of the cover, said flange extending all around the opening and having its outer side slightly inclined inward toward the opening $c$, as shown in Fig. 1. The opening $c$ is of convex form all around its side, as shown at $e$ in Fig. 1, and the under surface of the cover B, between the flange $d$ and the rabbet $a$, has annular grooves $f$ made in it to cause the molasses or other bait used to adhere to it. The flies, in order to reach the bait, will pass through the opening $c$ and around under the flange $d$ to the bait. The flange $d$ prevents the return of the flies, which, as they collect under the cover and around the inner side of the upper part of the tumbler, gradually fall or are knocked down into the suds below, in consequence of being crowded and by the commotion produced by those on the wing.

Having thus described my invention, what I claim as new, and desire to secure by Letters Patent, is—

The cover B, when provided with an opening, $c$, surrounded at its lower edge by a flange, $d$, and used in combination with a tumbler, A, or other similar or suitable vessel, to form an improved fly-trap, as herein set forth.

N. P. BASSETT.

Witnesses:
 THOMAS FOSTER, Jr.,
 ORRIN SMITH.